(12) United States Patent
Qiu et al.

(10) Patent No.: US 7,936,683 B2
(45) Date of Patent: May 3, 2011

(54) SYSTEM AND METHOD OF MONITORING NETWORK PERFORMANCE

(75) Inventors: Chaoxin Qiu, Austin, TX (US); Jeffrey Scruggs, Round Rock, TX (US); Robert Dailey, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 388 days.

(21) Appl. No.: 11/765,607

(22) Filed: Jun. 20, 2007

(65) Prior Publication Data

US 2008/0316931 A1    Dec. 25, 2008

(51) Int. Cl.
*H04L 12/26* (2006.01)
(52) U.S. Cl. ......... 370/242; 370/241; 714/704; 714/706
(58) Field of Classification Search ........................ None
See application file for complete search history.

(56) References Cited

U.S. PATENT DOCUMENTS

| | | | | |
|---|---|---|---|---|
| 5,699,348 A * | 12/1997 | Baidon et al. | ................. | 370/242 |
| 6,411,623 B1 * | 6/2002 | DeGollado et al. | ......... | 370/395.1 |
| 6,766,369 B1 * | 7/2004 | Haitsuka et al. | .............. | 709/224 |
| 2002/0069259 A1 * | 6/2002 | Kushwaha et al. | ........... | 709/217 |
| 2003/0229818 A1 * | 12/2003 | Dunlop et al. | ..................... | 714/4 |
| 2005/0213606 A1 * | 9/2005 | Huang et al. | .................. | 370/467 |
| 2006/0265376 A1 * | 11/2006 | Tagane et al. | ...................... | 707/9 |
| 2007/0030826 A1 * | 2/2007 | Zhang et al. | .................. | 370/331 |
| 2007/0067470 A1 * | 3/2007 | Ayers et al. | .................... | 709/230 |
| 2007/0283022 A1 * | 12/2007 | Rajko et al. | .................... | 709/227 |

OTHER PUBLICATIONS

Rosenberg et al, RFC 3261, "SIP: Session Initiation Protocol", http://tools.ietf.org/html/rfc3261, Jun. 2002.*

* cited by examiner

*Primary Examiner* — Huy D Vu
*Assistant Examiner* — James P Duffy
(74) *Attorney, Agent, or Firm* — Toler Law Group

(57) ABSTRACT

A method of monitoring network performance is disclosed and includes receiving a session initiation protocol (SIP) response message from one of a plurality of serving-call session control function (S-CSCF) systems at a centralized error monitoring server of an Internet Protocol (IP) Multimedia Subsystem (IMS). The SIP response message includes at least one error code that matches an error monitoring initial filter criterion included in a subscriber profile. The method also includes sending an alert message to a fault management system of the IMS when at least one threshold related to SIP error codes is met or exceeded based on the at least one error code.

23 Claims, 7 Drawing Sheets

US 7,936,683 B2

SYSTEM AND METHOD OF MONITORING NETWORK PERFORMANCE

FIELD OF THE DISCLOSURE

The present disclosure is generally related to monitoring network performance.

BACKGROUND

Most carrier-grade network service infrastructures employ fault management systems that monitor network hardware failures. Such systems do not detect network faults that are not due to network component failures, such as translation errors, routing errors, user account setup errors, and other configuration errors on various network elements. Some service providers may develop offline systems to analyze call log data, but they typically do not indicate errors or network faults in real-time or near real-time, such that errors can be handled proactively. Accordingly, there is a need for improved systems and methods of monitoring network performance.

DETAILED DESCRIPTION OF THE DRAWINGS

Figure 1:
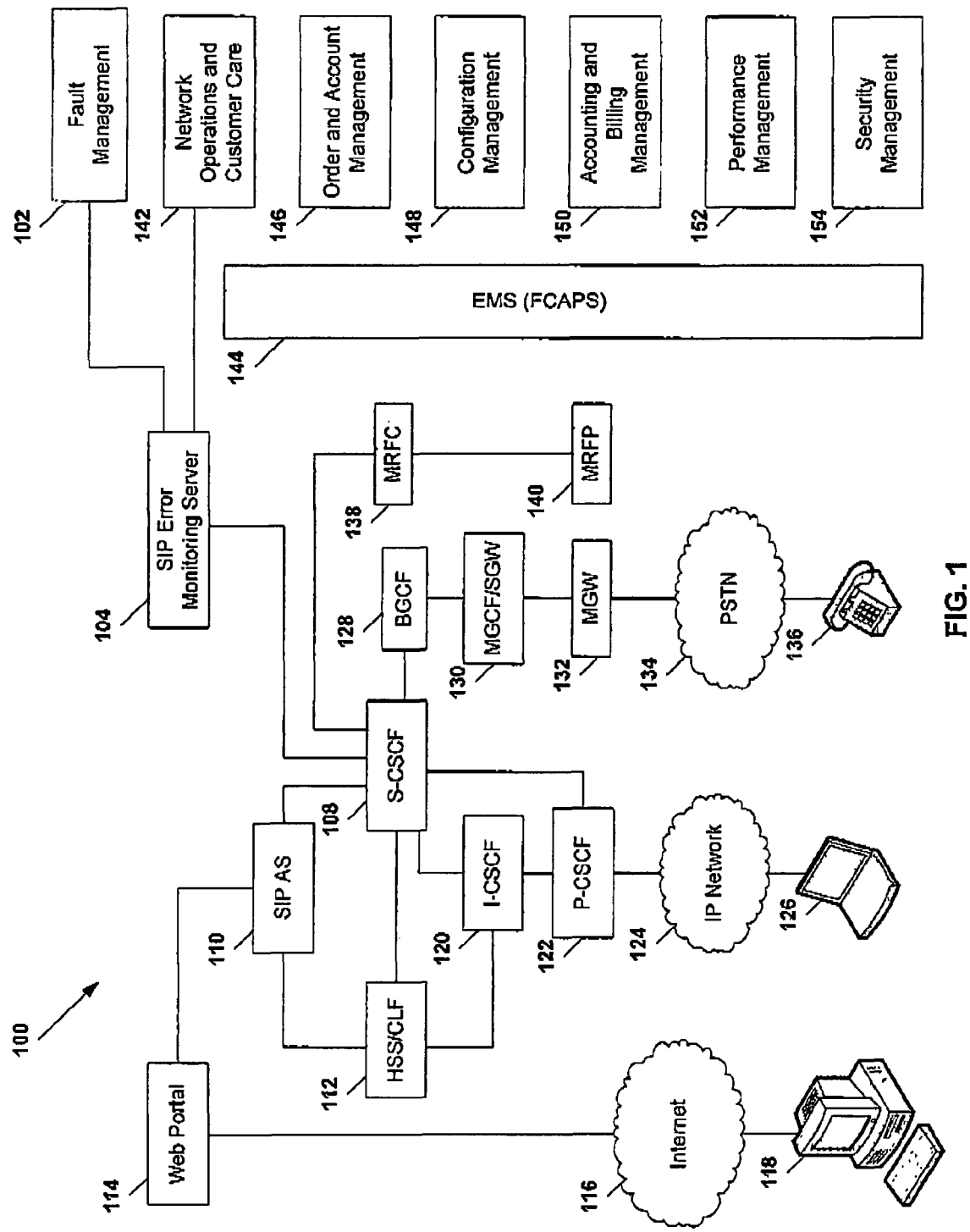
FIG. 1 is a block diagram of a particular embodiment of a system to monitor network performance.

A system to monitor network performance is disclosed and includes a session initiation protocol (SIP) error monitoring server communicating with an Internet Protocol (IP) Multimedia Subsystem (IMS). The SIP error monitoring server has processing logic and memory accessible to the processing logic. The memory includes instructions executable by the processing logic to receive a SIP response message from one of a plurality of serving-call session control function (S-CSCF) systems. The SIP response message includes at least one error code that matches an error monitoring initial filter criterion included in a subscriber profile. The memory also includes instructions executable by the processing logic to send an alert message to a fault management system of the IMS when at least one threshold related to SIP error codes is met or exceeded based on the at least one error code.

In another embodiment, a system to monitor network performance is disclosed and includes a serving-call session control function (S-CSCF) system having processing logic and memory accessible to the processing logic. The memory includes a subscriber profile cache to store a subscriber service profile. The memory also includes instructions executable by the processing logic to send a session initiation protocol (SIP) response message to a centralized error monitoring server of an Internet Protocol (IP) Multimedia Subsystem (IMS) when the SIP response message includes at least one error code that matches one of a plurality of initial filter criteria included in a profile of a user of the IMS.

In another embodiment a method of monitoring network performance is disclosed and includes receiving a session initiation protocol (SIP) response message from one of a plurality of serving-call session control function (S-CSCF) systems at a centralized error monitoring server of an Internet Protocol (IP) Multimedia Subsystem (IMS). The SIP response message includes at least one error code that matches an error monitoring initial filter criterion of a subscriber service profile. The method also includes sending an alert message to a fault management system of the IMS when at least one SIP error code threshold is met or exceeded based on the at least one error code.

In another embodiment a method of monitoring network performance is disclosed and includes caching a subscriber service profile at a serving-call session control function (S-CSCF) system of an Internet Protocol (IP) Multimedia Subsystem (IMS). The subscriber service profile includes a plurality of error monitoring initial filter criteria. The method also includes sending a session initiation protocol (SIP) response message from the S-CSCF system to a centralized error monitoring server of the IMS when the SIP response message includes at least one error code that matches one of the plurality of error monitoring initial filter criteria included in the subscriber profile.

In another embodiment, a method of monitoring network performance is disclosed and includes receiving an alert at a fault management system of an Internet Protocol (IP) Multimedia Subsystem (IMS) from a centralized session initiation protocol (SIP) error monitoring server. The alert indicates that a threshold number of SIP response messages including error codes matching at least one error monitoring initial filter criterion of a subscriber server profile have been received at the centralized error monitoring server.

In another embodiment, a computer-readable medium is disclosed and includes processor-readable instructions adapted to cause a processor to execute a method comprising receiving a session initiation protocol (SIP) response message from one of a plurality of serving-call session control function (S-CSCF) systems at a centralized error monitoring server of an Internet Protocol (IP) Multimedia Subsystem (IMS), where the SIP response message includes at least one error code that matches an error monitoring initial filter criterion included in a subscriber profile; and sending an alert message to a fault management system of the IMS when at least one threshold related to SIP error codes is met or exceeded based on the at least one error code.

Referring to FIG. 1, a particular embodiment of a system to monitor network performance is illustrated and designated generally 100. The system 100 includes a fault management system 102 that communicates with a centralized session initiation protocol (SIP) error monitoring server 104. The fault management system 102 and the SIP error monitoring server 104 can communicate with various network entities of a converged Internet Protocol (IP) Multimedia Subsystem (IMS) architecture. For example, the SIP error monitoring server 104 is adapted to receive SIP response messages that include one or more error codes from a plurality of serving-call session control function (S-CSCF) systems, such as the S-CSCF system 108. The S-CSCF 108 can include one or more user agent servers (UAS) to receive SIP requests and responses. Further, the SIP error monitoring server 104 can communicate with a network operations and customer care system 142.

In an illustrative embodiment, the S-CSCF system 108 and the SIP AS 110 can communicate with a home subscriber server (HSS) 112 that stores a user profile database, authenticates users, and provides user location information. Further, the SIP AS 110 communicates with a web portal 114 that can provide access to the IMS architecture by a terminating device, such as a computing device 118 communicating the Internet 116. In addition, the S-CSCF system 108 can manage communications to and from user terminals to which it is assigned by the HSS 112, such as a user portable computing device 126 communicating with an IP network. For instance, the S-CSCF system 108 can inspect SIP messages associated with communications bound to and from the user computing device 126, provide routing services, and identify application servers and other servers to which SIP messages will be sent.

In an illustrative, non-limiting embodiment, the S-CSCF system 108 can communicate with a media resource function controller (MRFC) 138 that controls a media resource function processor (MRFP) 140 that implements media related functions, such as multimedia conferencing, text-to-speech conversion, announcements and other pre-recorded messages, and other functions. The system 100 can include other network entities, such as an element management system 144, an order and account management system 146; a configuration management system 148, an accounting and billing management system 150; a performance management system 152; and a security management system 154.

In an illustrative example, a user can attempt to place a call via the user computing device 126. The S-CSCF 108 receives a SIP request message (e.g., an INVITE message) from the computing device 126 via the P-CSCF 122. If the call is bound for a terminating device on a circuit switched network, such as a POTS phone 136 coupled to a public-switched telephone network 134, the S-CSCF system 108 can communicate with a break-out gateway control function (BGCF) system 128 to determine which media gateway controller should receive voice data associated with the call, such that the call is routed to the media gateway 132 that communicates with the particular PSTN 134 associated with the POTS phone 136. If the call is bound for a terminating device on the IMS, the S-CSCF 108 can communicate the SIP request to the I-CSCF 120, and the I-CSCF 120 can communicate with the HSS 112 to determine which S-CSCF of the IMS communicates with the terminal device. The I-CSCF 120 can send the SIP request message to the appropriate S-CSCF, and the SIP request message can be sent through another P-CSCF communicating with the terminating device.

The terminating device can send a SIP response message back to the user computing device 126 via a similar reverse process to that used to send the SIP request message to the terminating device. The S-CSCF system 108 can be adapted to receive a SIP response message via the IMS from a terminating device receiving a call. A SIP response can include data indicating, for example, that a call is ringing, is queued, is successful, or is being re-directed. In a particular embodiment, a SIP response may include error codes indicating one or more errors related to call setup, such as client failure errors (4xx error codes), server failure errors (5xx error codes), or global failure errors (6xx error codes). The S-CSCF 108 can determine a calling party or device (e.g., the user computing device 126) based on the SIP response message. Further, the S-CSCF 108 can access a profile associated with the calling party or device. The profile is cached at the S-CSCF 108 upon registration of the device with the IMS.

In an illustrative embodiment, each IMS subscriber has an associated profile, such as a service profile. Each profile contains one or more Initial Filter Criteria (iFC) associated with a Service Point Trigger (SPT). The SPT specifies a particular point of call processing, at which the S-CSCF system 108 is to check a SIP message against the associated iFC. The iFC specifies one or more particular conditions upon which a particular application server should be invoked by the S-CSCF 108 forwarding the SIP message to the particular application server. The iFC can include the SIP URI of the application server that is to be invoked when one or more of the iFC is satisfied.

In a particular embodiment, each subscriber profile can include initial filter criteria related to SIP error monitoring. For example, the error monitoring iFC can designate one or more SIP error codes. Further, the iFC can specify a URI of the SIP error monitoring server 104. If a SIP response message includes one or more of the error codes included in the iFC, the S-CSCF system 108 can send the SIP response message to the error monitoring server 104.

The S-CSCF system 108 can determine whether a SIP response message includes one or more of the plurality of error codes in the error monitoring iFC included in the profile. If the SIP response message includes one or more of the plurality of error codes, the S-CSCF system 108 can send the SIP response message to the SIP error monitoring server 104. After the SIP error monitoring server 104 processes the SIP response message, the S-CSCF system 108 can receive the SIP response message back from the SIP error monitoring server 104 and send the SIP response message to the calling device.

After the SIP error monitoring server 104 receives the SIP response message, the SIP error monitoring server 104 parses the SIP response message to extract information from its header fields, such as from/to information, error codes, P-Asserted-Identity, session description protocol (SIP) components, or other information. The SIP error monitoring server 104 can store the parsed information, log error codes, and increment one or more counters related to the error codes. Further, the SIP error monitoring server 104 can check the error code counter(s) against one or more alert thresholds. If any threshold is met or exceeded as a result of an error code in the SIP message, the SIP error monitoring server 104 can send an alert, such as a Simple Network Management Protocol (SNMP) trap message, to the fault management system 102.

In an illustrative embodiment, thresholds defined at the SIP error monitoring server 104 can include a total number of error codes in SIP responses within to the IMS network over a period of time, a number of particular error codes in SIP responses within the IMS network over a period of time, a total number of error codes in SIP response messages within a geographic area over a period of time, a number of particular error codes within a geographic area over a period of time, or any combination thereof.

In a particular embodiment, the fault management system 102 can determine one or more network problems based on the alert sent by the SIP error monitoring server 104. A detailed history log of captured SIP error messages can be stored at the SIP error monitoring server 104 and is accessible to the fault management system 102 and network operation personnel. In another embodiment, the fault management system 102 can send data indicating the alert and the type(s) of error code(s) on which the alert is based to a network operations and customer care system 142. The network operations and customer care system 142 can query the SIP error monitoring server 104 for information associated with SIP response messages that include such error code(s), and the network operations and customer care system 142 or service provider representatives can determine the network problem(s) giving rise to the error code(s).

Figure 2:
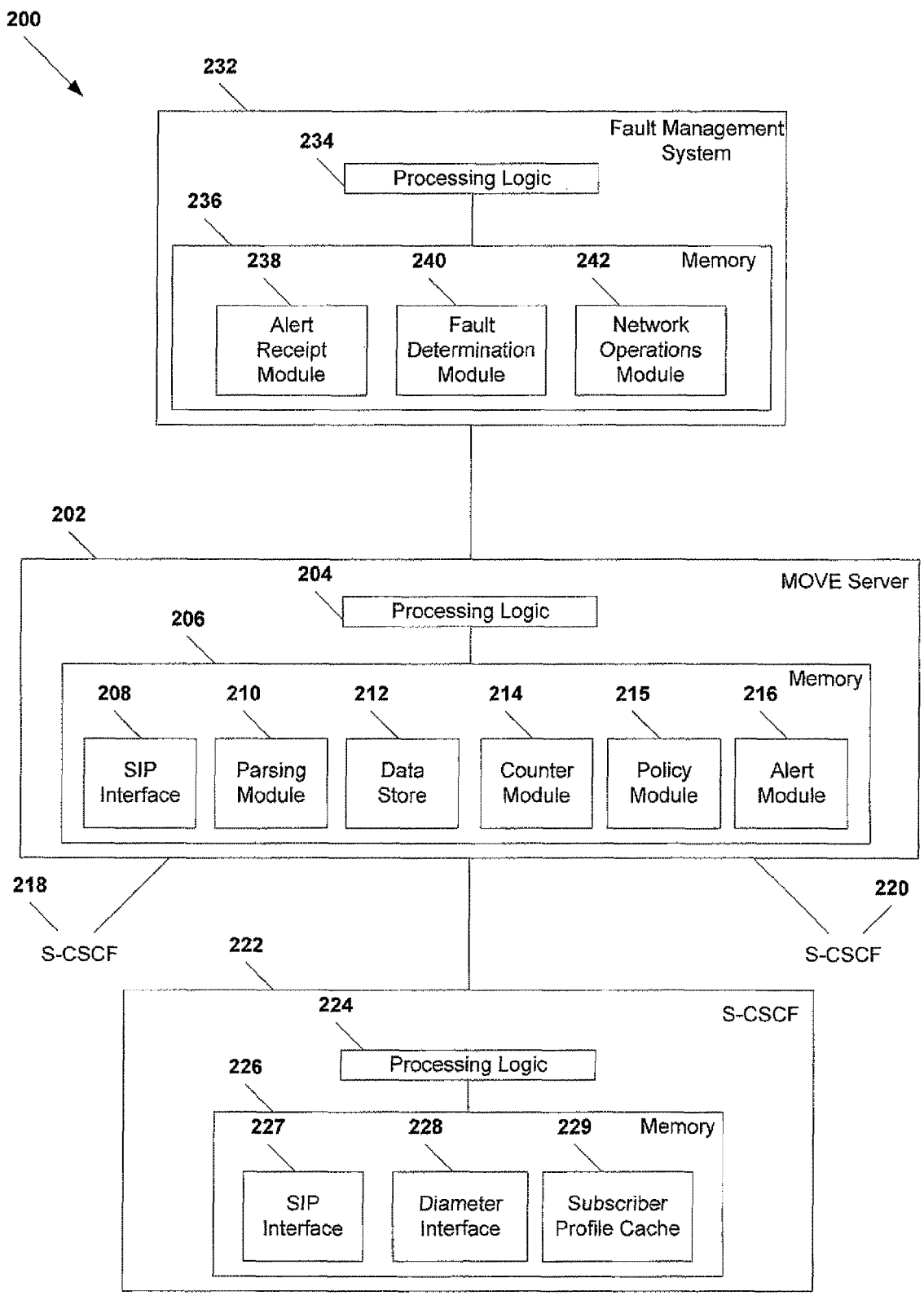
FIG. 2 is a block diagram of a second particular embodiment of a system to monitor network performance.

Referring to FIG. 2, a second particular embodiment of a system to monitor network performance is illustrated and designated generally 200. The system 200 includes a monitoring server for Voice-over Internet Protocol (VoIP) networks (MOVE server) 202 that communicates with a plurality of serving-call session control function (S-CSCF) systems 218-222 and with a fault management system 232. In an illustrative embodiment, the MOVE server 202, the plurality of S-CSCF systems 218-222, and the fault management system 232 can be entities within an Internet Protocol (IP) Multimedia Subsystem (IMS) architecture.

In a particular embodiment, the MOVE server 202 can include processing logic 204 and memory 206 accessible to the processing logic 204. The memory 206 can include a plurality of modules 208-216 that provide various functions of the MOVE server 202. The plurality of modules 208-216 can include hardware logic, instructions executable by the processing logic 204, or a combination thereof. In one embodiment, the plurality of modules 208-216 can include software instructions embodied within one or more computer programs stored within the memory 206.

For example, the memory 206 can include a SIP Interface 208 that is executable by the processing logic 204 to receive session initiation protocol (SIP) response messages matching one or more initial filter criteria (iFC) from the plurality of S-CSCF systems 218-222. The memory 206 can also include a parsing module 210 that is executable by the processing logic 204 to parse each SIP response message to extract information from its header fields, such as from/to information, error codes, P-Asserted-Identity, session description protocol (SDP) components, or other information. The MOVE server 202 can store the parsed information and log error codes at a data store 212.

Further, the memory 206 can include a counter module 214 that is executable by the processing logic 204 to store and increment one or more counters related to error codes. For instance, the counter module 214 can be executable by the processing logic 204 to store and increment counters related to each error code, each error code category (e.g., client errors, server errors, global errors, configuration errors, translation errors, inter-operability errors, etc.), one or more particular error codes in a geographic area, one or more particular error codes during a pre-defined period of time, or any combination thereof.

In addition, the memory 206 can include a policy module 215 that is executable by the processing logic 204 to store data indicating one or more thresholds that specify when an alert is to be sent to the fault management system 232. The memory 206 can include an alert module 216 that is executable by the processing logic 204 to compare the error code counter(s) against one or more alert thresholds. If any of the thresholds is met or exceeded as a result of an error code in a SIP response message, the alert module 216 is executable by the processing logic 204 to generate an alert message, such as a Simple Network Management Protocol (SNMP) trap message, and to send the alert to the fault management system 232.

In a particular embodiment, each of the plurality of S-CSCF systems 218-222 can include processing logic 224 and memory 226 that is accessible to the processing logic 224. The memory 226 can include modules 227-229 that include instructions, hardware, or any combination thereof, which are adapted to provide various functions of the S-CSCF 222. The S-CSCF 222 can also include other modules and interfaces as required by present or future Third Generation Partnership Project (3GPP) IMS standards. In a particular embodiment, the memory 226 can include a SIP interface 227 that is executable by the processing logic 224 to receive SIP request and SIP response messages and to send such messages to other network entities of the IMS, including (without limitation) the MOVE server 202. Further, the memory 226 can include a DIAMETER interface 228 that is executable by the processing logic 224 to load user profiles from a home subscriber system (HSS), where each user profile includes one or more initial filter criteria (iFC). Such user profiles can be temporarily stored at the subscriber profile cache 229.

In a particular embodiment the initial filter criteria (iFC) in a user profile cached at the S-CSCF 222 can include error monitoring iFC that specify a service point trigger (SPT) at which the S-CSCF 222 check whether a SIP response message includes one or more error codes. Further, the error monitoring iFC can specify a uniform resource locator or uniform resource indicator that identifies the MOVE server 202.iFC. If the SIP response message at least partially matches the error monitoring iFC, the SIP interface 227 can send the SIP response to the MOVE server 202. In an illustrative embodiment, the SIP interface 227 can receive the SIP response message back from the MOVE server 202 after it is processed at the MOVE server 202.

In a particular embodiment, the fault management system 232 can include processing logic 234 and memory 236 that is accessible to the processing logic 234. The memory 236 can include an alert receipt module 238 that is executable by the processing logic 234 to receive alerts from the MOVE server 202. In addition, the memory 236 can include a fault determination module 240 that is executable by the processing logic 234 to find other network alarms that may be related to the alert received from the MOVE server 202. In an illustrative embodiment, the memory 236 can include a network operations module 242 that is executable by the processing logic 234 to send data indicating an alert, the type(s) of error code(s) on which an alert is based, any fault(s) determined by the fault management system, or any combination thereof, to a network operations and customer care system at which a service provider can identify the network fault(s) and arrange for their repair.

Figure 3:
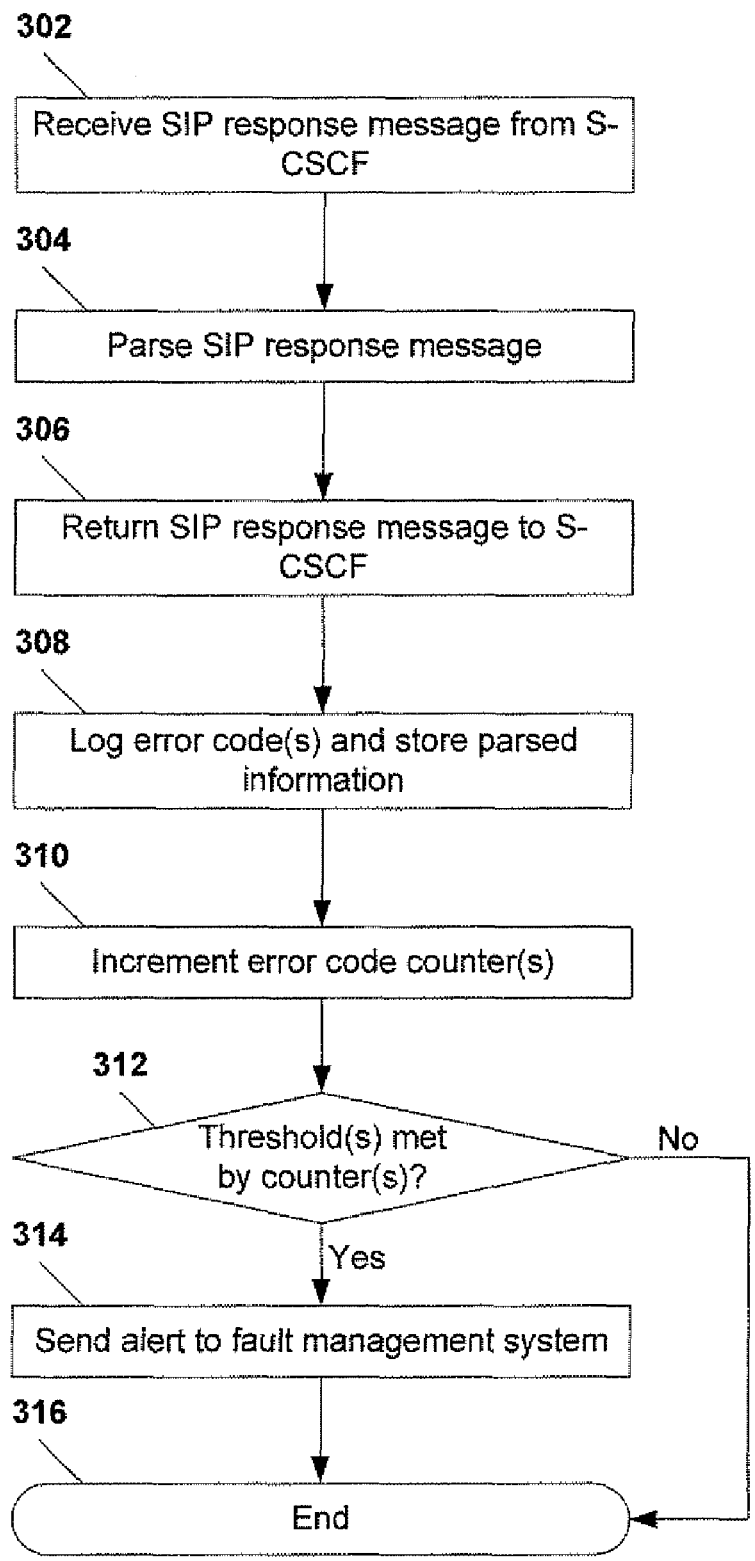
FIG. 3 is a flow chart of a particular embodiment of a method of monitoring network performance.

Referring to FIG. 3, a particular embodiment of a method of monitoring network performance is illustrated. At block 302, a SIP error monitoring server receives a session initiation protocol (SIP) response message matching at least one initial filter criteria from one of a plurality of serving-call session control function (S-CSCF) systems at, such as a monitoring server for a Voice-over Internet Protocol (VoIP) network (a MOVE server). Moving to block 304, the SIP error monitoring server parses the SIP response message to extract information including one or more error codes. In an illustrative embodiment, the SIP error monitoring server can also extract from/to information, P-Asserted-Identity, session description protocol (SDP) components, other header information, or any combination thereof from the SIP response message.

Proceeding to block 306, the SIP error monitoring server returns the SIP response message to the S-CSCF. At block 308, the SIP error monitoring server stores the parsed information and logs error codes included in the SIP response message. Continuing to block 310, the SIP error monitoring server increments one or more counters related to the error codes included in the SIP response message. Advancing to decision node 312, the SIP error monitoring server determines whether any counter incremented as a result of the SIP response message meets or exceeds a threshold. If a threshold is met or exceeded, the method can proceed to block 314, and the SIP error monitoring server sends an alert message to a fault management system. In a particular embodiment, the alert message can be a Simple Network Management Protocol (SNMP) trap message. The method terminates at 316.

In an illustrative embodiment, thresholds defined at the SIP error monitoring server can include a total number of error codes in SIP responses within to the IMS network over a period of time, a number of particular error codes in SIP responses within the IMS network over a period of time, a total number of error codes in SIP response messages within a geographic area over a period of time, a number of particular error codes within a geographic area over a period of time, or any combination thereof.

Figure 4:
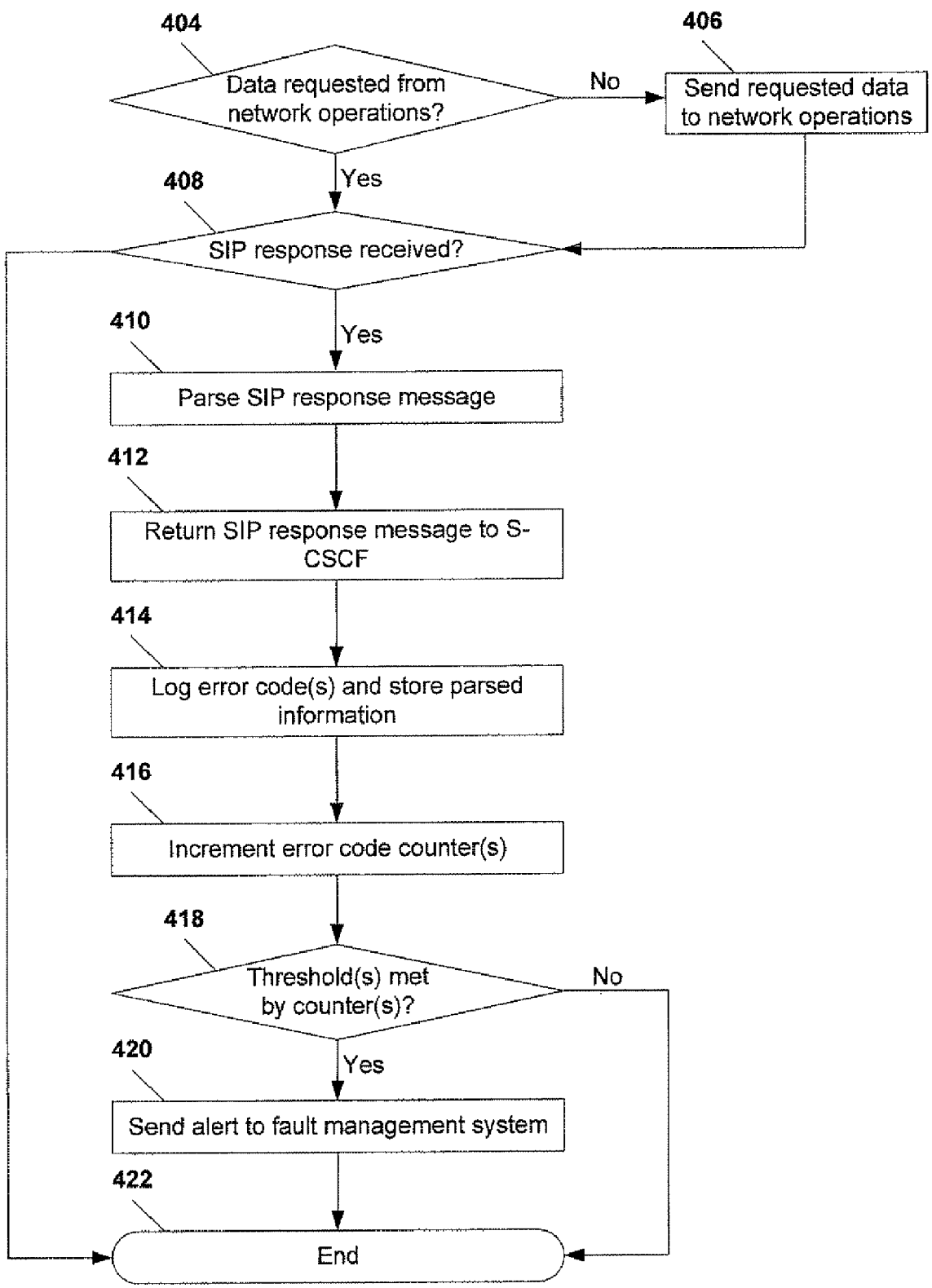
FIG. 4 is a flow chart of a second particular embodiment of a method of monitoring network performance.

Referring to FIG. 4, a second particular embodiment of a method of monitoring network performance is illustrated. At block 404, in an illustrative, non-limiting embodiment, a session initiation protocol (SIP) error monitoring server, such as a monitoring server for a Voice-over Internet Protocol (VoIP) network (a MOVE server), can determine whether data related to one or more SIP error alerts has been requested by a network operations center or system. If no such data has been requested, the method proceeds to decision node 408. Conversely, if data has been requested by a network operations center or system, the method moves to block 406, and the SIP error monitoring server sends the requested data, such as error codes and other information parsed from SIP response messages on which the alert message was based, to the network operations center or system. The method then proceeds to decision node 408.

Proceeding to decision node 408, the SIP error monitoring server determines whether it has received a SIP response message meeting at least one initial filter criteria from one of a plurality of serving-call session control function (S-CSCF) systems within an Internet Protocol (IP) Multimedia Subsystem (IMS). If a SIP response message has not been received, the method can terminate at 422. Conversely, if a SIP response message has been received, the method moves to block 410, and the SIP error monitoring server parses the SIP response message to extract information including one or more error codes. In an illustrative embodiment, the SIP error monitoring server can also extract from/to information, P-Asserted-Identity, session description protocol (SDP) components, other information, or any combination thereof from the SIP response message.

Proceeding to block 412, the SIP error monitoring server returns the SIP response message to the S-CSCF. At block 414, the SIP error monitoring server stores the parsed information and logs error codes included in the SIP response message. Continuing to block 416, the SIP error monitoring server increments one or more counters related to the error codes included in the SIP response message. Advancing to decision node 418, the SP error monitoring server determines whether any counter incremented as a result of the SIP response message meets or exceeds a threshold. If such a threshold is not met or exceeded, the method can terminate at 422. Conversely, if a threshold is met or exceeded, the method can proceed to block 420, and the SIP error monitoring server sends an alert message to a fault management system. In a particular embodiment the alert message can be a Simple Network Management Protocol (SNMP) trap message.

In an illustrative embodiment, thresholds defined at the SIP error monitoring server can include a total number of error codes in SIP responses within to the IMS network over a period of time, a number of particular error codes in SIP responses within the IMS network over a period of time, a total number of error codes in SIP response messages within a geographic area over a period of time, a number of particular error codes within a geographic area over a period of time, or any combination thereof.

Figure 5:
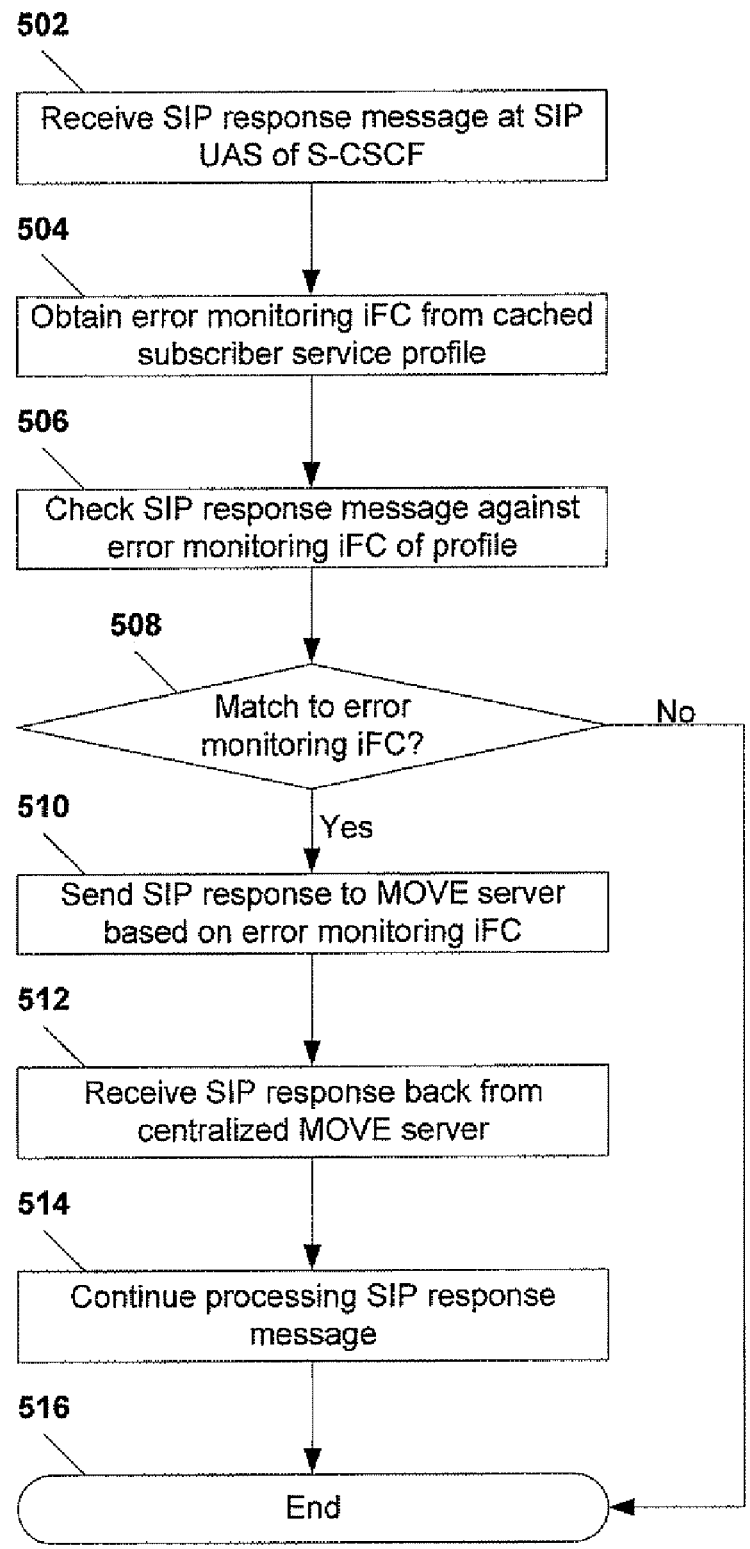
FIG. 5 is a flow chart of a third particular embodiment of a method of monitoring network performance.

Referring to FIG. 5, a third particular embodiment of a method of monitoring network performance is illustrated. At block 502, a user agent server of a serving-call session control function (S-CSCF) system receives a session initiation protocol (SIP) response message from a called party device via a converged Internet Protocol (IP) Multimedia Subsystem (IMS) architecture. Moving to block 504, the S-CSCF system obtains error monitoring initial filter criteria (iFC) from a subscriber service profile cached at the S-CSCF. The error monitoring initial filter criteria (iFC), can include one or more SIP error codes.

Proceeding to block 506, the S-CSCF system checks the SIP response message against the error monitoring iFC of the profile. Continuing to decision node 508, the S-CSCF system determines whether the SIP response message matches one or more of the error monitoring iFC. For example, the S-CSCF system can determine whether the SIP response message includes one or more error codes, such as client errors, server errors, global errors, configuration errors, translation errors, inter-operability errors, or any combination thereof. If the SIP response message does not match any of the initial filter criteria, the method terminates at 516.

Conversely, if the SIP response message matches one or more of the initial filter criteria, the method continues to block 510, and the S-CSCF system sends the SIP response message to a centralized SIP error monitoring server, such as Monitoring Server for Voice-over Internet Protocol (MOVE server). Advancing to block 512, in a particular embodiment the S-CSCF system can receive the SIP response message back from the MOVE server after it is processed. Moving to block 514, the S-CSCF continues processing the SIP response message. The method terminates at 516.

Figure 6:
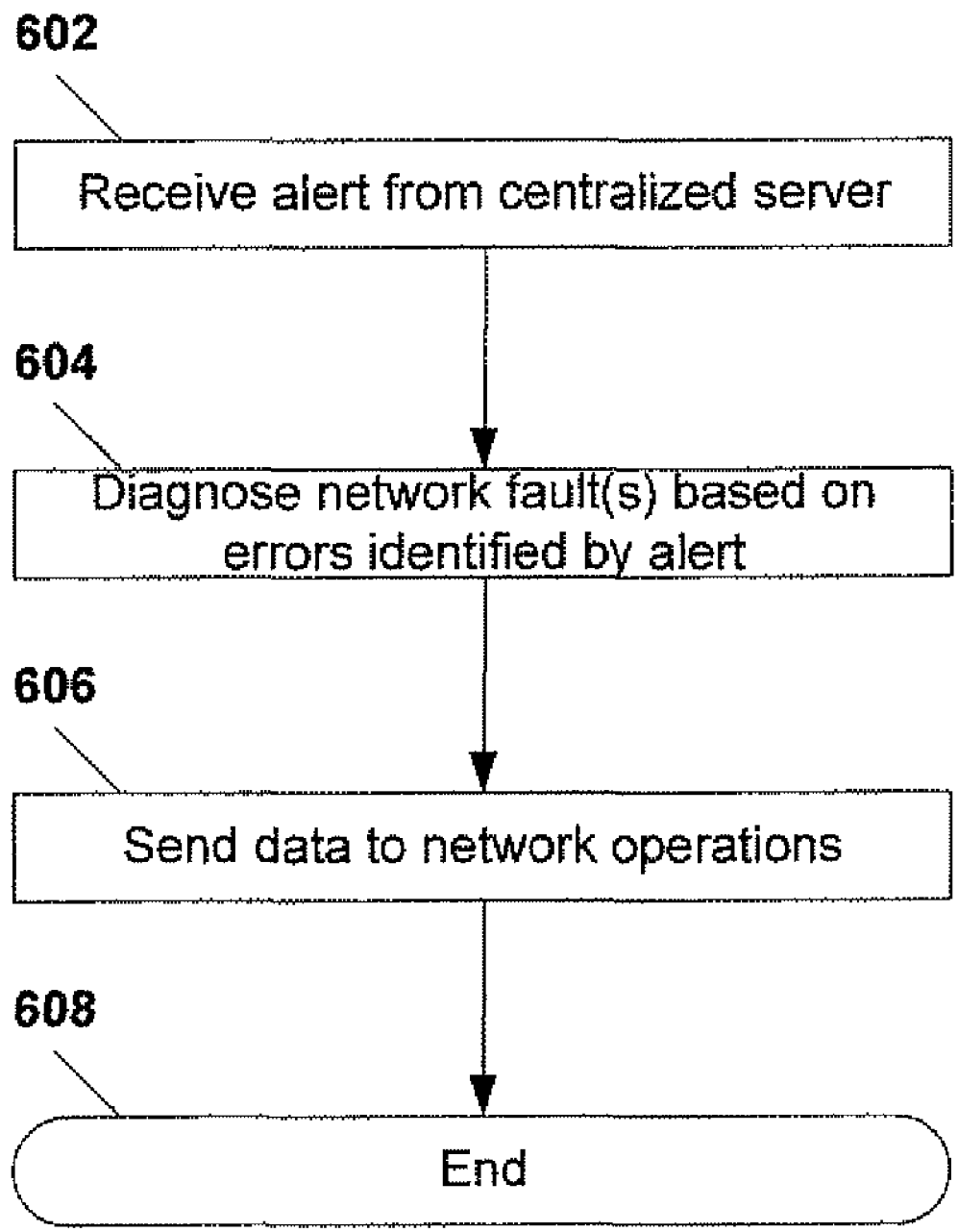
FIG. 6 is a flow chart of a fourth particular embodiment of a method of monitoring network performance.

Referring to FIG. 6, a fourth particular embodiment of a method of monitoring network performance is illustrated. At block 602, a fault management system of a converged Internet Protocol (IP) Multimedia Subsystem (IMS) receives an alert from a centralized server. Moving to block 604, the fault management system can diagnose one or more configuration faults or other network faults based on the SIP error(s) identified by the alert. In another embodiment network operation personnel can diagnose a network fault by cross checking the alert sent by the SIP error monitoring server with other network alerts. Proceeding to block 606, the fault management system can send data related to the alert one or more configuration errors, one or more other network faults, or any combination thereof, to a network operations system. The method terminates at 608.

In some embodiments, the disclosed methods can be performed as described herein. In other embodiment, some aspects of the methods can be performed in alternative sequences or simultaneously. For example, a SIP error monitoring server can log error codes parsed from a SIP response message and return the SIP response message to a S-CSCF from which it was received, simultaneously.

In conjunction with the configuration of structure disclosed herein, systems and methods of monitoring network performance are provided that include a SIP error monitoring server, such as a monitoring server for a Voice-over Internet Protocol (VoIP) network (a MOVE server), which serves as a central point to monitor failed call setup attempts and provide early warnings related to trouble conditions that are not due to network hardware or software failures.

Figure 7:
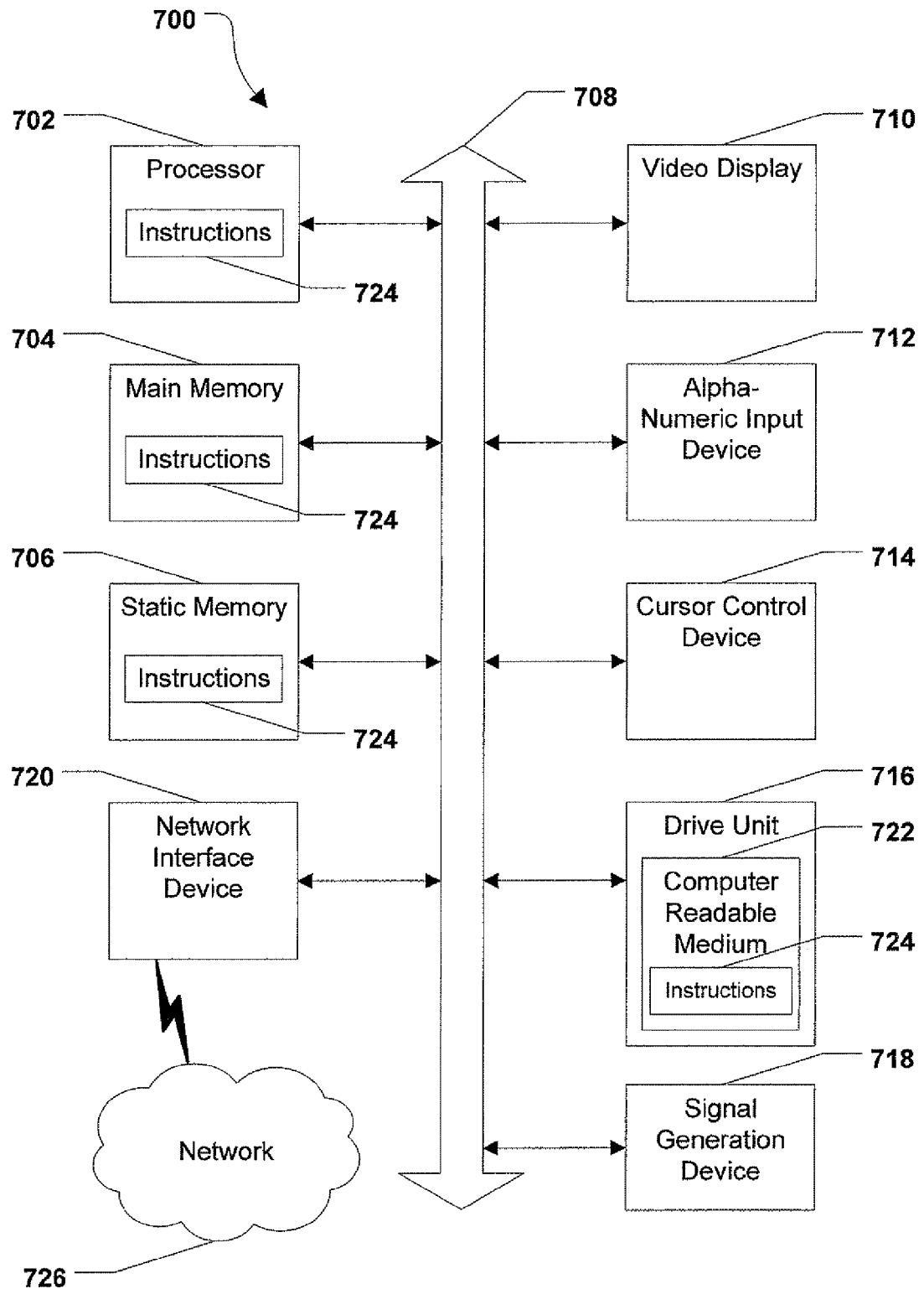
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices, such as a serving-call session control function (S-CSCF) system, a fault management server, a session initiation protocol (SIP) error monitoring server, a network operations system, or other servers, systems or network entities, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid-state display, or a cathode ray tube (CRT. Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of monitoring network performance, the method comprising:
   receiving a session initiation protocol (SIP) response message from a particular serving-call session control function (S-CSCF) system of a plurality of S-CSCF systems at a centralized error monitoring server of an Internet Protocol (IP) Multimedia Subsystem (IMS), wherein the SIP response message is sent to the centralized error monitoring server when the SIP response message includes at least one error code included in an initial filter criteria of a calling device associated with the SIP response message, the initial filter criteria accessed by the S-CSCF system;
   incrementing one or more counters related to the at least one error code;
   returning the SIP response message from the centralized error monitoring server to the particular S-CSCF system, wherein the particular S-CSCF system is configured to send the SIP response message received from the centralized error monitoring server to the calling device; and
   sending an alert message to a fault management system of the IMS from the centralized error monitoring server when a number of error codes counted by a particular counter exceeds a threshold for the particular counter.

2. The method of claim 1, wherein a particular error code of the at least one error code is categorized as a configuration error code.

3. The method of claim 1, wherein a particular error code of the at least one error code is categorized as a translation error code.

4. The method of claim 1, wherein a particular error code of the at least one error code is categorized as an inter-operability error.

5. The method of claim 1, further comprising parsing the SIP response message to extract information including the at least one error code.

6. The method of claim 5, wherein the extracted information includes data indicating a source of a call, data indicating a destination of the call, data indicating a P-Asserted-Identity, data identifying session description protocol (SDP) components, or any combination thereof.

7. The method of claim 5, further comprising storing the extracted information and logging the at least one error code.

8. The method of claim 5, further comprising sending at least a portion of the extracted information to a network operations system.

9. A method of monitoring network performance, the method comprising:
   caching a subscriber service profile at a serving-call session control function (S-CSCF) system of an Internet Protocol (IP) Multimedia Subsystem (IMS), wherein the subscriber service profile includes a plurality of error monitoring initial filter criteria;
   sending a session initiation protocol (SIP) response message from the S-CSCF system to a centralized error monitoring server of the IMS when the SIP response message includes at least one error code that matches one of the plurality of error monitoring initial filter criteria included in the subscriber profile;
   receiving the SIP response message back from the centralized error monitoring server; and
   sending the SIP response message received from the centralized error monitoring server to a calling device associated with the subscriber profile.

10. The method of claim 9, wherein data indicating that a number of error codes exceeds a threshold in a particular category is accessible to a fault management system of the IMS via the centralized error monitoring server.

11. The method of claim 9, wherein data included in a plurality of SIP response messages having error codes matching at least one of the initial filter criteria is accessible to a network operations system of the IMS via the centralized error monitoring server.

12. The method of claim 9, wherein the at least one error code indicates a call setup error, a call processing error, or any combination thereof.

13. A system to monitor network performance, the system comprising:
   a session initiation protocol (SIP) error monitoring server communicating with an Internet Protocol (IP) Multimedia Subsystem (IMS), the SIP error monitoring server having processing logic and memory accessible to the processing logic, wherein the memory includes:
      instructions executable by the processing logic to receive a SIP response message from a particular serving-call session control function (S-CSCF) system of a plurality of S-CSCF systems, wherein the SIP response message includes at least one error code that matches an error monitoring initial filter criterion included in a subscriber profile;

instructions executable by the processing logic to increment one or more counters related to the at least one error code;

instructions executable by the processing logic to return the SIP response message to the particular S-CSCF system, wherein the particular S-CSCF system is configured to send the SIP response message received from the SIP error monitoring server to a calling device associated with the subscriber profile; and instructions executable by the processing logic to send an alert message to a fault management system of the IMS when a number of error codes counted by a particular counter exceeds a threshold for the particular counter.

14. The system of claim 13, wherein the alert message is a Simple Network Management Protocol (SNMP) trap message.

15. The system of claim 13, wherein the memory includes instructions executable by the processing logic to receive a request from a network operations system for information related to SIP response messages including error codes on which the alert is based and to send at least a portion of the information to the network operations system.

16. A system to monitor network performance, the system comprising:

a serving-call session control function (S-CSCF) system having processing logic and memory accessible to the processing logic, wherein the memory includes:

a subscriber profile cache to store a subscriber service profile; and instructions executable by the processing logic to:

send a session initiation protocol (SIP) response message to a centralized error monitoring server of an Internet Protocol (IP) Multimedia Subsystem (IMS) when the SIP response message includes at least one error code that matches one of a plurality of error monitoring initial filter criteria included in the subscriber profile;

receive the SIP response message back from the centralized error monitoring server; and send the SIP response message received from the centralized error monitoring server to a calling device associated with the subscriber profile.

17. The system of claim 16, wherein data indicating that a number of error codes exceeds a threshold in a particular category is accessible to a fault management system of the IMS via the centralized error monitoring server.

18. The system of claim 16, wherein the memory includes instructions executable by the processing logic to send the SIP response message received back from the centralized error monitoring server to a calling device associated with the SIP response message.

19. The system of claim 16, wherein the error monitoring initial filter criteria includes a uniform resource locator or uniform resource indicator of the centralized error monitoring server.

20. The system of claim 16, wherein the subscriber profile cache is adapted to store the subscriber service profile when a device associated with the subscriber is registered with the IMS.

21. A computer-readable medium including processor-readable instructions executable by a processor to:

receive a session initiation protocol (SIP) response message from a particular serving-call session control function (S-CSCF) system of a plurality of S-CSCF systems at a centralized error monitoring server of an Internet Protocol (IP) Multimedia Subsystem (IMS), wherein the SIP response message includes at least one error code that matches an error monitoring initial filter criterion included in a subscriber profile;

increment one or more counters related to the at least one error code at the centralized error monitoring server;

return the SIP response message from the centralized error monitoring server to the particular S-CSCF system wherein the particular S-CSCF system is configured to send the SIP response message received from the centralized error monitoring server to a calling device associated with the subscriber profile; and send an alert message to a fault management system of the IMS from the centralized error monitoring server when a number of error codes counted by a particular category exceeds a threshold for the particular counter.

22. The computer-readable medium of claim 21, wherein the method includes receiving a plurality of SIP response messages from the plurality of S-CSCF systems, wherein each of the SIP response messages includes an error code matching an error monitoring initial filter criterion stored at the S-CSCF system from which the SIP response message is received.

23. The computer-readable medium of claim 21, wherein a subscriber associated with the subscriber profile is a calling party that initiates a session that includes the one of the plurality of S-CSCF systems that receives the SIP response message.

\* \* \* \* \*